US011652935B2

(12) United States Patent
Ogino

(10) Patent No.: US 11,652,935 B2
(45) Date of Patent: May 16, 2023

(54) IMAGE FORMING APPARATUS AND METHOD FOR CONTROLLING IMAGE FORMING APPARATUS

(71) Applicant: SHARP KABUSHIKI KAISHA, Sakai (JP)

(72) Inventor: Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/412,103

(22) Filed: Aug. 25, 2021

(65) Prior Publication Data

US 2022/0070318 A1    Mar. 3, 2022

(30) Foreign Application Priority Data

Sep. 1, 2020    (JP) .............................. JP2020-147059

(51) Int. Cl.
*H04N 1/00*            (2006.01)
(52) U.S. Cl.
CPC ....... *H04N 1/00517* (2013.01); *H04N 1/0097* (2013.01); *H04N 1/00482* (2013.01); *H04N 2201/0094* (2013.01)
(58) Field of Classification Search
CPC ........... H04N 1/00517; H04N 1/00482; H04N 1/0097; H04N 2201/0094

USPC ........................................................ 358/1.13
See application file for complete search history.

(56) References Cited

U.S. PATENT DOCUMENTS

| 10,394,503 | B2 | 8/2019 | Kobayashi | |
|---|---|---|---|---|
| 2018/0373481 | A1 | 12/2018 | Kobayashi | |
| 2019/0124212 | A1* | 4/2019 | Hama | H04N 1/00482 |
| 2019/0245989 | A1* | 8/2019 | Yoshida | G06F 3/1205 |
| 2020/0084327 | A1* | 3/2020 | Inoue | G06F 3/1205 |
| 2020/0159479 | A1* | 5/2020 | Yoshida | G06F 3/1234 |

FOREIGN PATENT DOCUMENTS

| CN | 108292198 A | 7/2018 |
|---|---|---|
| JP | 2008-103903 A | 5/2008 |
| JP | 2009-284204 A | 12/2009 |
| JP | 2014-028528 A | 2/2014 |

* cited by examiner

*Primary Examiner* — Neil R McLean
(74) *Attorney, Agent, or Firm* — ScienBiziP, P.C.

(57) ABSTRACT

An image forming apparatus that performs a setting related to a job and executes the job includes: a display that displays an operation screen; a storage that stores a setting history which is past setting information; and a controller that performs a display process to the display, a setting process of performing the setting, and a process of executing the job. The controller displays, on the display, the operation screen for selecting the setting history, performs a setting of the job on the basis of each of a plurality of setting histories selected from the operation screen, and executes the job.

10 Claims, 17 Drawing Sheets

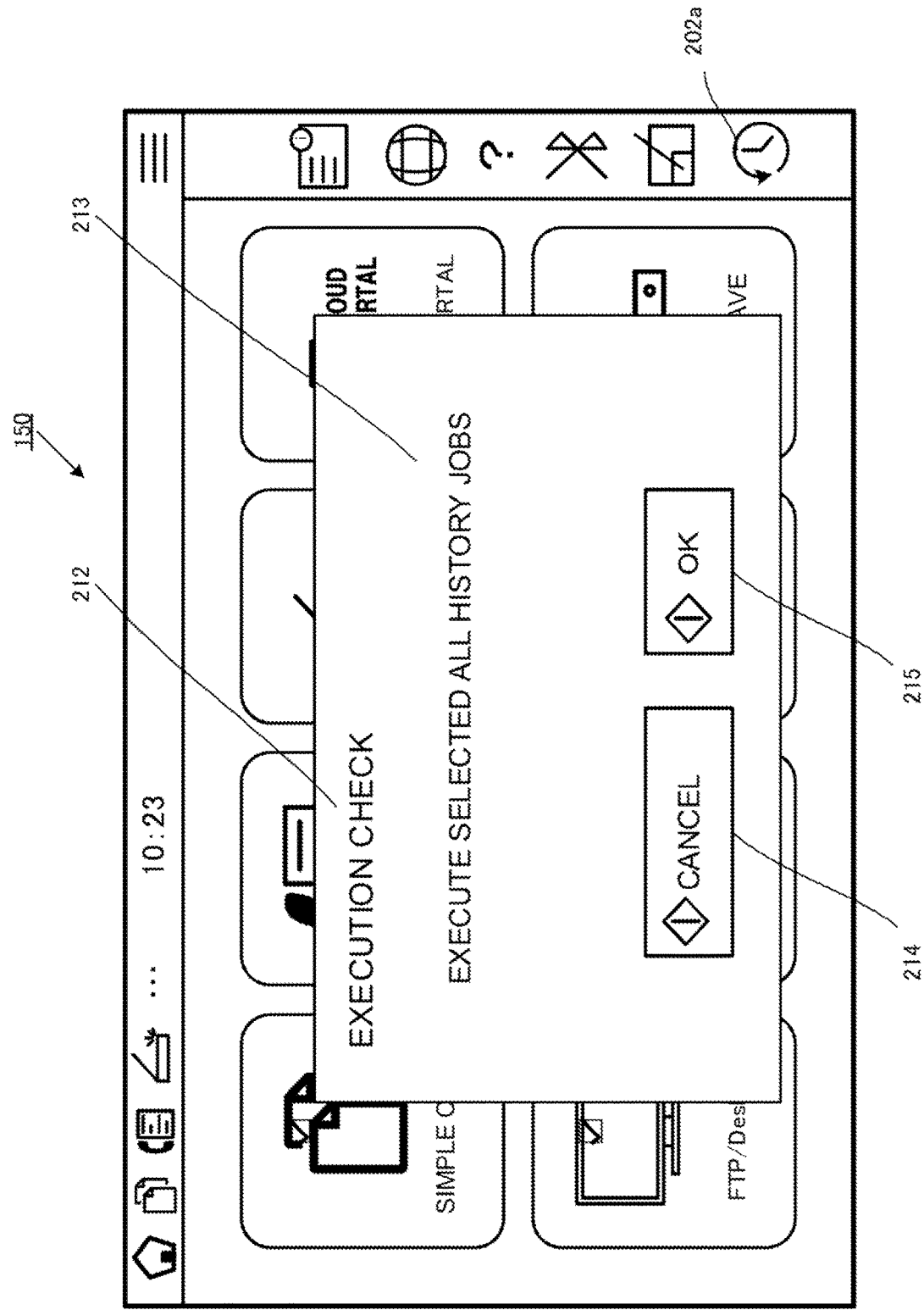

IMAGE FORMING APPARATUS AND METHOD FOR CONTROLLING IMAGE FORMING APPARATUS

BACKGROUND OF THE INVENTION

Field of the Invention

The present invention relates to an image forming apparatus and the like that perform settings by using a job setting history.

Description of the Background Art

Conventionally, settings of a job are registered in an image forming apparatus and called to be set. However, when the setting is changed to a different setting, it is troublesome to re-enter an item.

Therefore, in Japanese Unexamined Patent Application Publication No. 2008-103903, it is disclosed that when one piece of job operation history information is selected from a plurality of pieces of job operation history information, settings of a past image processing mode indicated by the job operation history information is reflected in settings of a current image processing mode to simplify the operation.

However, in Japanese Unexamined Patent Application Publication No. 2008-103903, in the case of execution of a plurality of jobs, operation to "call pieces of job operation history information, select desired job operation history information, extract settings included in the information of the job operation history, reflect the extracted settings in the settings of a current job, execute a job, call pieces of the job operation history information again, select next desired job operation history information, extract settings included in the job operation history information, reflect the extracted settings in the settings of a current job, and execute a job . . . " is repeated. Therefore, each time job execution is completed, job operation history information must be called, before subsequent operation is performed, which makes the operation very complicated.

In view of such circumstances, the present invention attempts to provide an image forming apparatus and the like which enable a plurality of job settings with simple operation by calling a setting history which is setting information of a job executed in the past.

SUMMARY OF THE INVENTION

The present disclosure is an image forming apparatus that performs a setting related to a job and executes the job, the image forming apparatus including: a display that displays an operation screen; a storage that stores a setting history which is past setting information; and a controller that performs a display process to the display, a setting process of performing the setting, and a process of executing the job; wherein the controller displays, on the display, the operation screen for selecting the setting history, performs a setting of the job on the basis of each of a plurality of the setting histories selected from the operation screen, and executes the job.

In addition, the present disclosure is a method for controlling an image forming apparatus that includes a display and a storage, and sets a setting related to a job and executes the job, the method including: displaying, on the display, an operation screen for selecting a setting history that is past setting information stored in the storage; performing settings of the job on the basis of a plurality of the setting histories selected from the operation screen; and executing the job.

According to the present disclosure, a user can select and set a plurality of setting histories before executing a job, and therefore it is possible to exhibit an excellent effect of saving the time and effort of calling and setting the setting histories each time the job is executed.

BRIEF DESCRIPTION OF THE DRAWINGS

FIG. 17 is an explanatory view Illustrating an execution check screen displayed on a display of the image forming apparatus according to the third embodiment.

DESCRIPTION OF THE PREFERRED EMBODIMENTS

Hereinafter, embodiments of the present disclosure will be described with reference to the accompanying drawings. The following embodiments are examples for explaining the present disclosure, and the technical scope of the invention described in the claims is not limited to the following description.

1. First Embodiment

1.1 Overall Configuration

Figure 1:
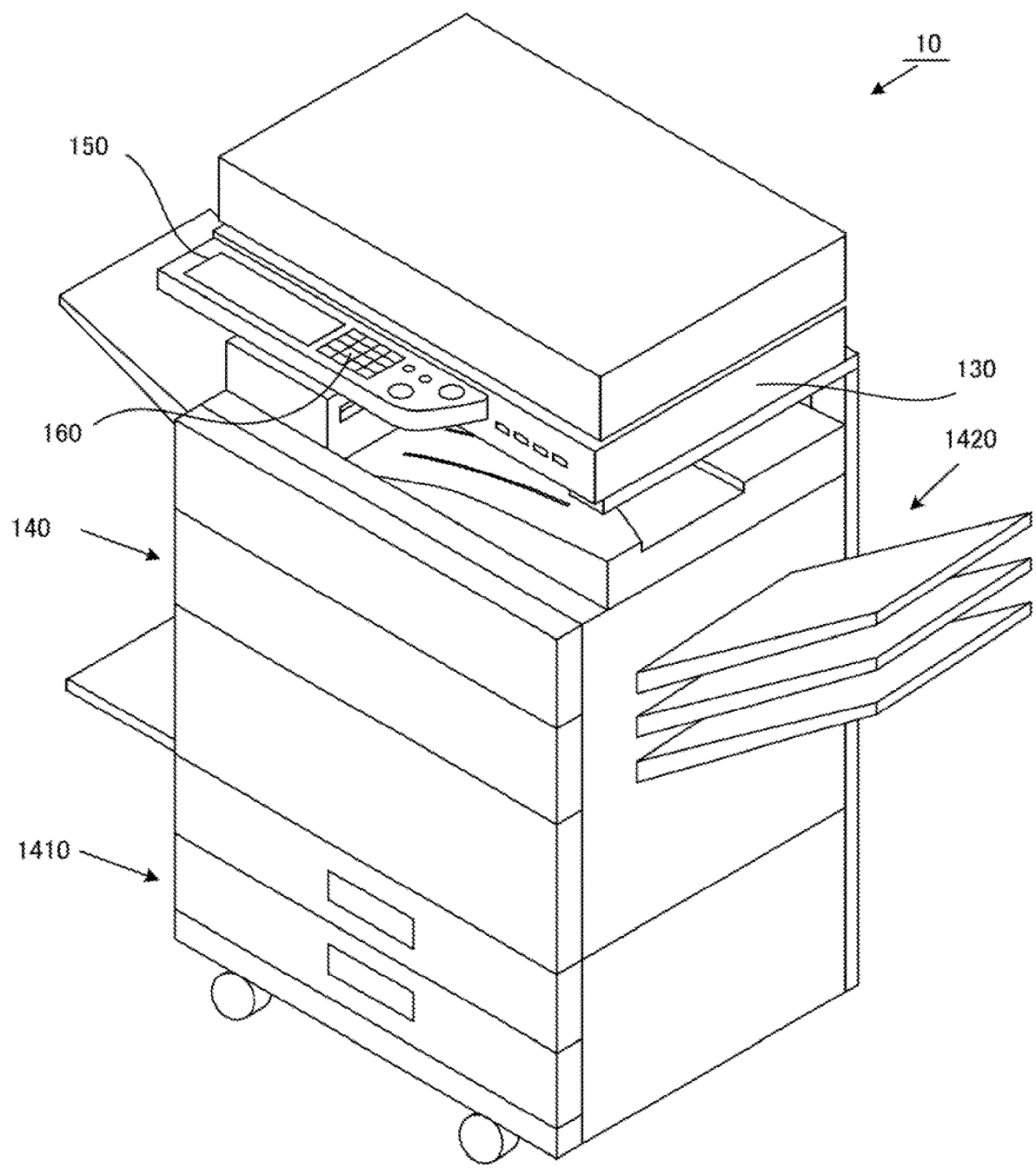
FIG. 1 is an explanatory view illustrating an overall configuration of an image forming apparatus according to a first embodiment.

FIG. 1 is an explanatory view illustrating an overall configuration of an image forming apparatus according to a first embodiment.

When an image forming apparatus 10 of the first embodiment is set, the image forming apparatus 10 stores information related to settings as a setting history each time an initial setting value is changed through an operator 160. In the image forming apparatus 10, when a job is set, setting histories are called and displayed in parallel in chronological order. A user selects and sets a plurality of pieces of desired information from these setting histories, displays a setting item display screen, and executes a job while checking the setting contents.

The image forming apparatus 10 illustrated in FIG. 1 is an MFP (Multifunction Printer) and has a plurality of kinds of modes related to a job process.

A job process mode is a mode that can realize general copy, fax, and scanner functions. When the image forming apparatus 10 is in a copy mode, a copy job can be executed, when the image forming apparatus 10 is in a fax mode, a fax job can be executed, and when the image forming apparatus 10 is in a scanner mode, a scanner job can be executed.

The copy job will be briefly described below. First, a document is set in a document reader 130, and copy operation is performed using the operator 160. A user can check the set document size, paper size, and copy settings (e.g., settings for single-sided printing, double-sided printing, and aggregate printing) by a display 150.

When the user performs the operation of start through the operator 160, the copy process is executed. Specifically, the document reader 130 reads the document set by the user. A controller 100, which will be described below, generates image data from the document read by the document reader 130.

An image former 140 generates an image based on the image data on the paper conveyed from a paper tray 1410 and outputs the image to a paper discharge tray 1420. In this embodiment, the paper refers to a recording sheet or recording paper on which an image is to be formed. The paper includes not only ordinary paper, but also various types of paper media such as thick paper and glossy paper, as well as a film and the like on which an image can be formed.

Now, the fax job will be briefly described below.

When fax transmission is to be performed, a document is set in the document reader 130 and fax transmission operation is performed by means of the operator 160. The user can check the set document size and transmission settings (destination fax number and the like) by means of the display 150.

When the user operates fax start through the operator 160, a fax process is executed. The controller 100, which will be described later, performs procedures for communication with a communication counterpart by means of a communicator 170. Further, when a transmission-enabled state is ensured, the controller 100 performs a necessary process such as change of the compression format of a compressed file, and then performs a process of sequentially transmitting the compressed file to the communication counterpart via a communication line.

In a case of fax receipt, the controller 100 receives the compressed file transmitted from a communication counterpart while performing communication procedures by means of the communicator 170, and a compression/decompression processor (not illustrated) performs a decompression process to the received compressed file. Then, various image processes are applied to image data and the image data is output to the image former 140. The image former 140 forms an output image on recording paper on the basis of the output image data.

In addition to the fax mode, it is also possible to transmit document image data by e-mail to an address stored in the storage 120 as a function of transmitting document image data that is read.

Now, the scanner job will be briefly described as follows.

First, a document is set in the document reader 130, and scanner operation is performed by means of the operator 160. The user can check the set document size and output image settings (image file type and the like) by means of the display 150.

When the user operates scan start operation through the operator 160, a scanner process is executed. Specifically, the document reader 130 reads the document set by the user. A controller 100, which will be described below, generates image data from the document read by the document reader 130.

The image forming apparatus 10 executes various jobs while combining these functions (the copy function, the fax function, and the scanner function). At this time, each time the user inputs settings for a plurality of setting items in each job, previously operated and set setting values are automatically extracted from a job operation history and are displayed as a setting history by means of an auto-complete function.

For the setting mode of the image forming apparatus, when the user operates the operator 160 to activate the setting mode, the controller 100 of the image forming apparatus 10 causes the setting mode to be displayed on a screen of the display 150. At this time, initial setting values of the setting items are displayed, and the setting items are allowed to be changed through the operator 160.

1.2 Functional Configuration

Figure 2:
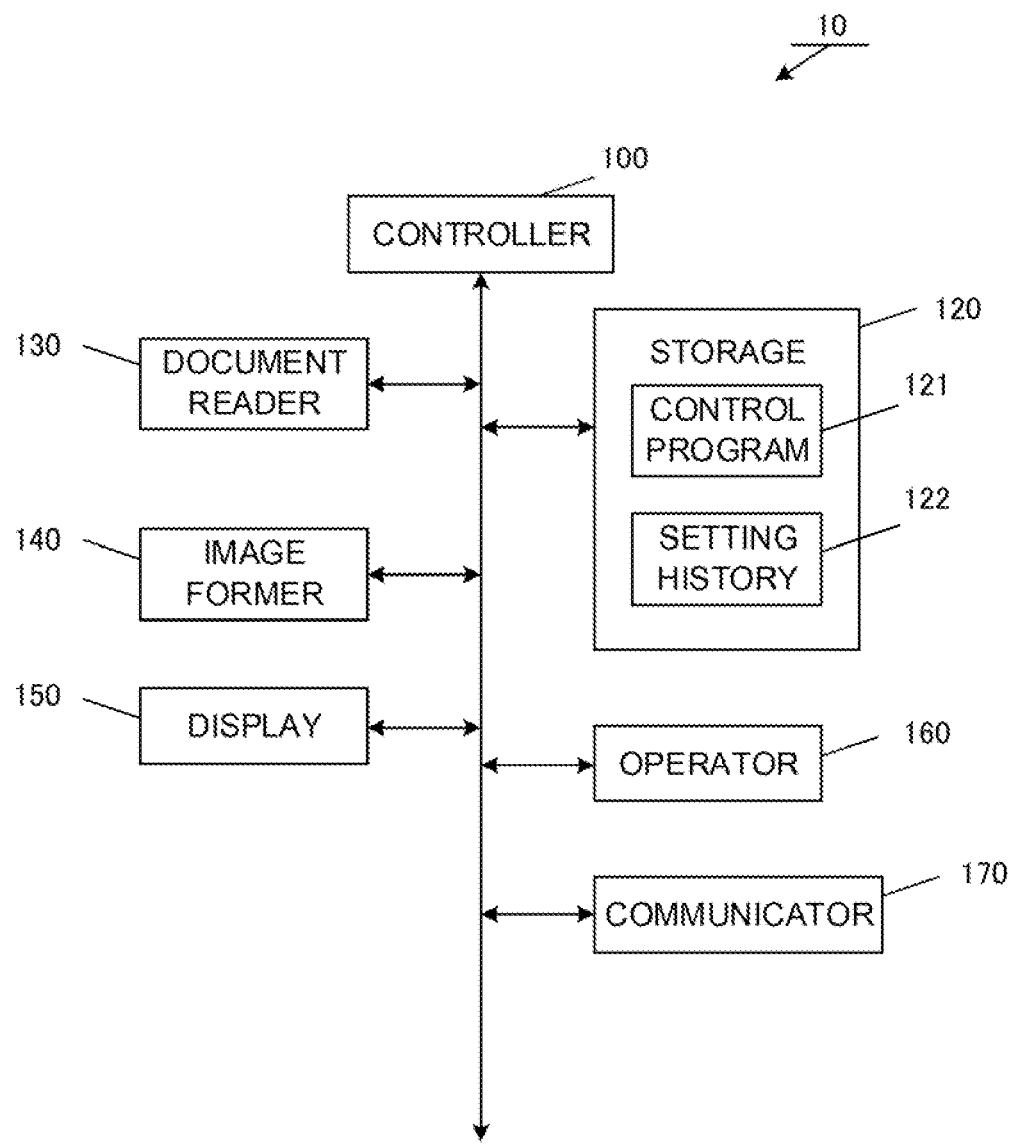
FIG. 2 is a block diagram illustrating a functional configuration of the image forming apparatus according to the first embodiment.

A functional configuration of the image forming apparatus 10 will be described with reference to FIG. 2. FIG. 2 is a block diagram illustrating the functional configuration of the image forming apparatus according to the first embodiment.

The controller 100 is a functional unit that controls the whole of the image forming apparatus 10. The controller 100 realizes various functions by reading and executing a control program 121 stored in the storage 120, and is composed of one or more arithmetic devices (for example, a CPU (Central Processing Unit) and the like. Hereinafter, the functions realized by the controller 100 will be described.

The controller 100 has a setting processing function of performing a setting process, an image forming processing function of performing an image forming process, and the like. The controller 100 executes a copy function, a fax function, a scanner function, and the like as the image forming processing function.

The storage 120 is a functional unit that stores a program and data. The storage 120 includes, for example, a semiconductor memory such as an SSD (Solid State Drive), and an HDD (Hard Disk Drive), and the like.

The storage 120 stores the control program 121 and a setting history 122.

The control program 121 is a program related to operation control of the image forming apparatus 10.

The setting history 122 is information related to setting information for a past job process of the image forming apparatus 10.

When job operation is performed, the storage 120 stores the information related to the job operation as a job operation history. This does not assume that the setting information is used although each setting information is included in the information related to the job operation. Therefore, the controller 100 extracts the setting information from the job operation history and stores the extracted setting information in the storage 120, as the setting history 122.

The document reader 130 reads an image of a document, and is composed of a scanner device or the like including a device that converts optical information into an electrical signal, such as a CIS (Contact Image Sensor) or a CCD (Charge Coupled Device), for example.

For example, the document reader 130 reads a document placed on a placing table in a range set by the document size. The document may be set on a placing or may be set on an automatic document feeding device (ADF: Auto Document Feeder).

The image former 140 is a functional unit that forms image data on a recording medium (for example, recording paper). For example, recording paper is fed from the paper tray 1410 in FIG. 1, and an image is formed on a surface of the recording paper in the image former 140, and therefore the paper is discharged from the paper discharge tray 1420. The image former 140 is composed of, for example, an electrophotographic laser printer.

The paper tray 1410 usually includes one or more paper trays to accommodate paper.

The display 150 displays various states of the image forming apparatus 10, and also displays the state of operation input. For example, the display 150 is composed of a liquid crystal display (LCD), an organic EL panel, an electronic paper using an electrophoresis system.

The operator 160 is a button, a switch, or the like that receives operation input from a user. The operator 160 may be realized by a hardware input device such as a switch and a keyboard, or by a touch panel or the like that is integrally formed with the display 150. In this case, a system of detecting input on the touch panel may be a common detection system such as a resistive film system, an infrared system, an electromagnetic induction system, and an electrostatic capacitive system.

The operator 160 of this embodiment includes a hardware input device and a touch panel of the display 150, each of which can be operated.

The communicator 170 communicates with other devices. For example, the communicator 170 has an interface that can be connected to a network and only needs to communicate with other device via a wired/wireless LAN (Local Area Network). Image data may also be transmitted and received from other device (for example, a USB memory, or the like) by a USB (Universal Serial Bus) interface or the like. Further, the communicator can be connected to a communication network such as a public line network, a LAN (Local Area Network) and the Internet, and a compressed file can be transmitted externally via the communication network by a communication method such as facsimile or e-mail.

The image forming apparatus 10 may further include a necessary function in addition to the above structure. For example, the image forming apparatus 10 may be provided with such a manager as a billing manager which allows the image forming apparatus 10 to be used only when a fee is paid by a user.

1.3 Flow of Process

Figure 3:
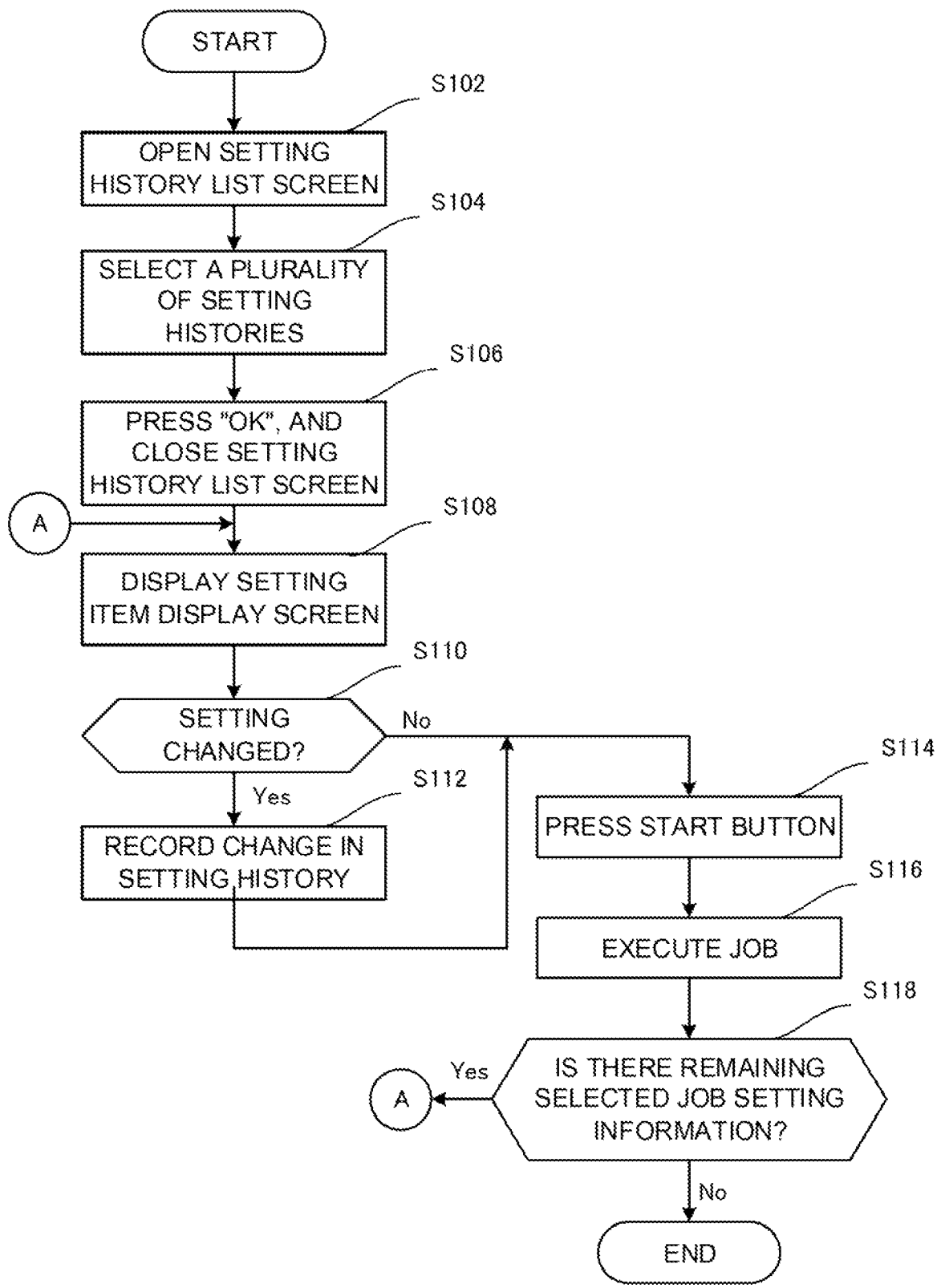
FIG. 3 is a flowchart illustrating a job process including a setting process of the image forming apparatus according to the first embodiment.

The setting process of the image forming apparatus will be described with reference to FIG. 3. FIG. 3 is a flowchart illustrating the job process including the setting process of the image forming apparatus according to the first embodiment.

The user operates a home screen displayed on the display 150 with the operator 160 (for example, clicks a setting history display icon 202a), and the controller 100 opens a setting history list screen on the display 150 (Step S102). A setting history within a preset constant period of time can be displayed on the setting history list screen. The user selects a plurality of setting histories for the job process by means of the operator 160 (Step S104). When the user presses an "OK" button, the controller 100 confirms the selection of the setting histories and closes the setting history list screen (Step S106).

The controller 100 displays a setting item display screen indicating one of the selected setting histories on the display 150 (Step S108). Each setting item is displayed on the setting item display screen and can be changed. The controller 100 checks whether there is setting change by the user (Step S110). When there is setting change, the change is stored in the setting history 122 of the storage 120 (Step S112), and then the process proceeds to Step S114. When there is no setting change, the process proceeds to Step S114.

In Step S114, when the user presses a "Start" button which is a job execution button (Step S114), the controller 100 executes the job with the contents displayed on the setting item display screen (Step S116). The controller 100 checks whether there is a remaining selected setting history (Step S118), and when there is the selected setting history, the process returns to Step S108. When there is no selected setting history, the process is terminated.

1.4 Operation Example

A specific example of the setting process of the first embodiment will be described on the basis of operation screens of FIG. 4 to FIG. 9. The job can be executed in various modes, but the copy mode will be herein described as an example.

Figure 4:
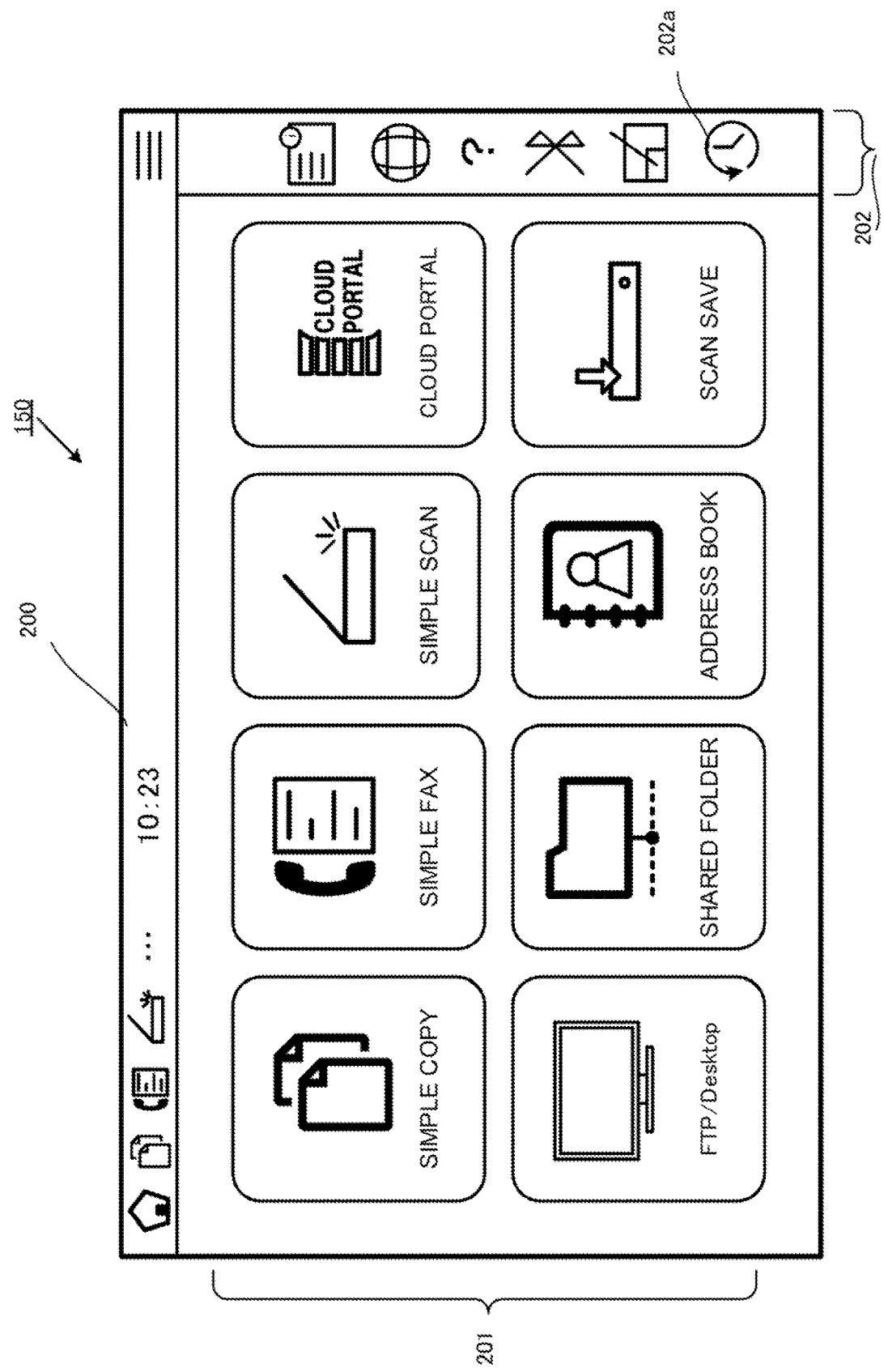
FIG. 4 is an explanatory view illustrating a home screen displayed on a display of the image forming apparatus according to the first embodiment.
Figure 5:
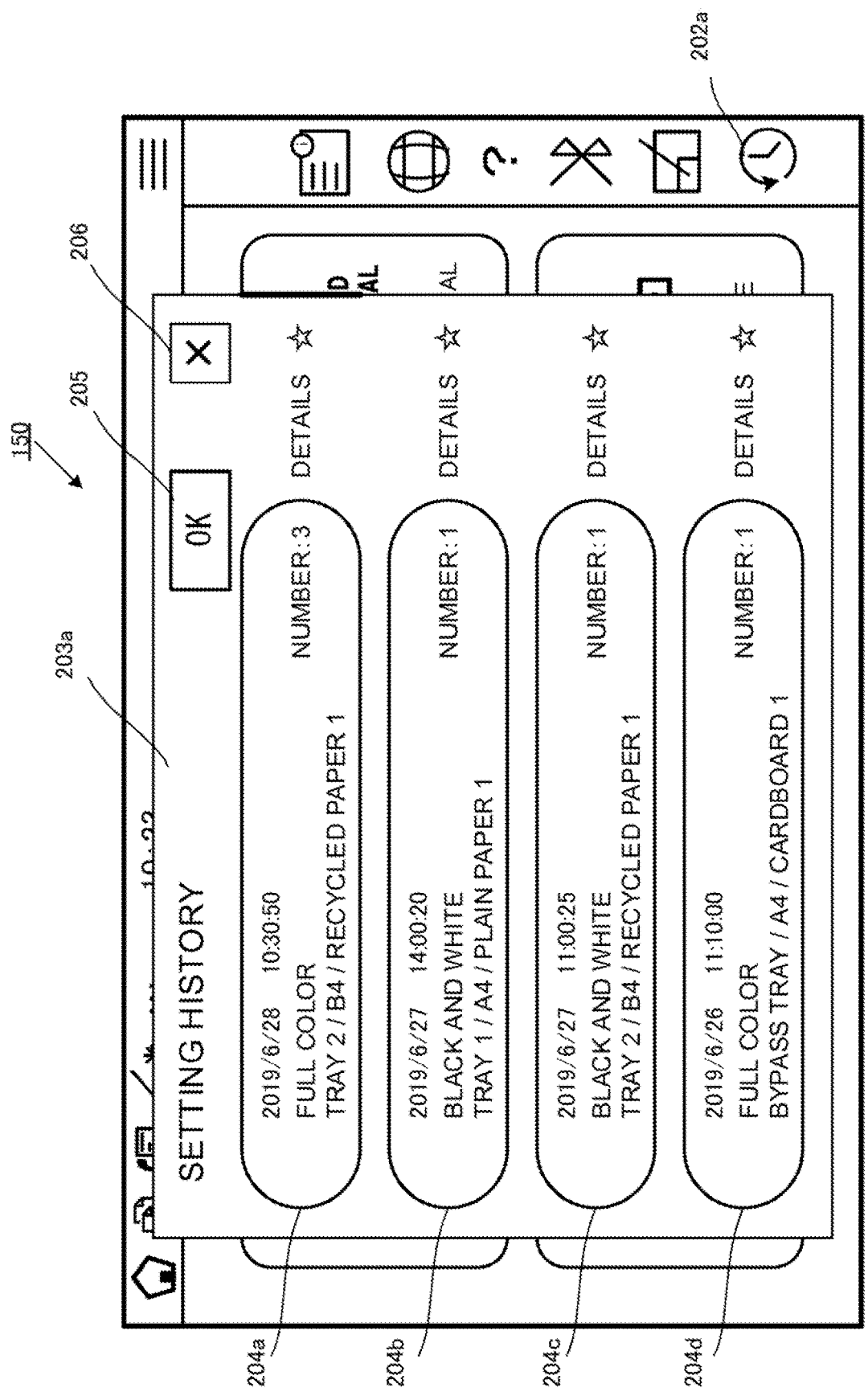
FIG. 5 is an explanatory view illustrating a setting history list screen displayed on the display of the image forming apparatus according to the first embodiment.

As illustrated in FIG. 4, a plurality of mode icons 201 are displayed on the home screen 200 displayed on the display 150, and operation icons 202 are displayed on the right side of the screen. When the user presses (touches) the setting history display icon 202a in the operation icons 202, a setting history list screen 203a is superimposed and displayed on the home screen 200, as illustrated in FIG. 5.

On the setting history list screen 203a, the setting histories of the previously executed jobs are displayed in chronological order, with the most recent one at the top. Although FIG. 5 illustrates setting histories 204a to 204d, even earlier setting histories are displayed by scrolling down. An "OK" button 205 and an "×" button 206 are displayed at the upper right of the setting history list screen 203a. The "OK" button 205 is a button for confirming the selection of the setting history described below and displaying the setting item display screen. The "×" button 206 is a button for closing the setting history list screen 203a.

Figure 6:
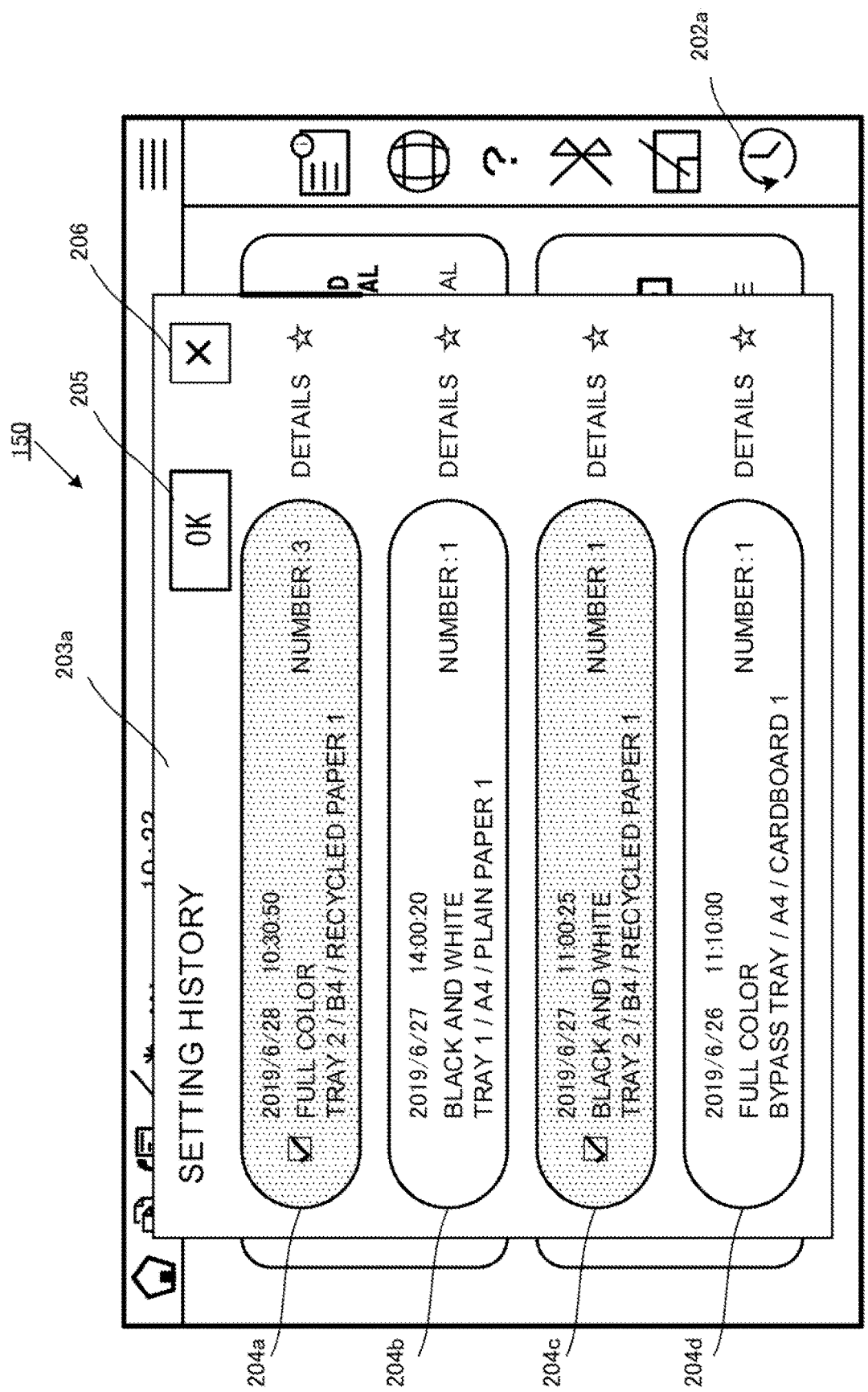
FIG. 6 is an explanatory view illustrating selection of setting histories of the setting history list screen.

When the user selects the setting histories 204a, 204c, the controller 100 displays check marks on the setting histories 204a, 204c and also changes the color of the background to indicate that the setting histories 204a, 204c are selected, as illustrated in FIG. 6.

Figure 7:
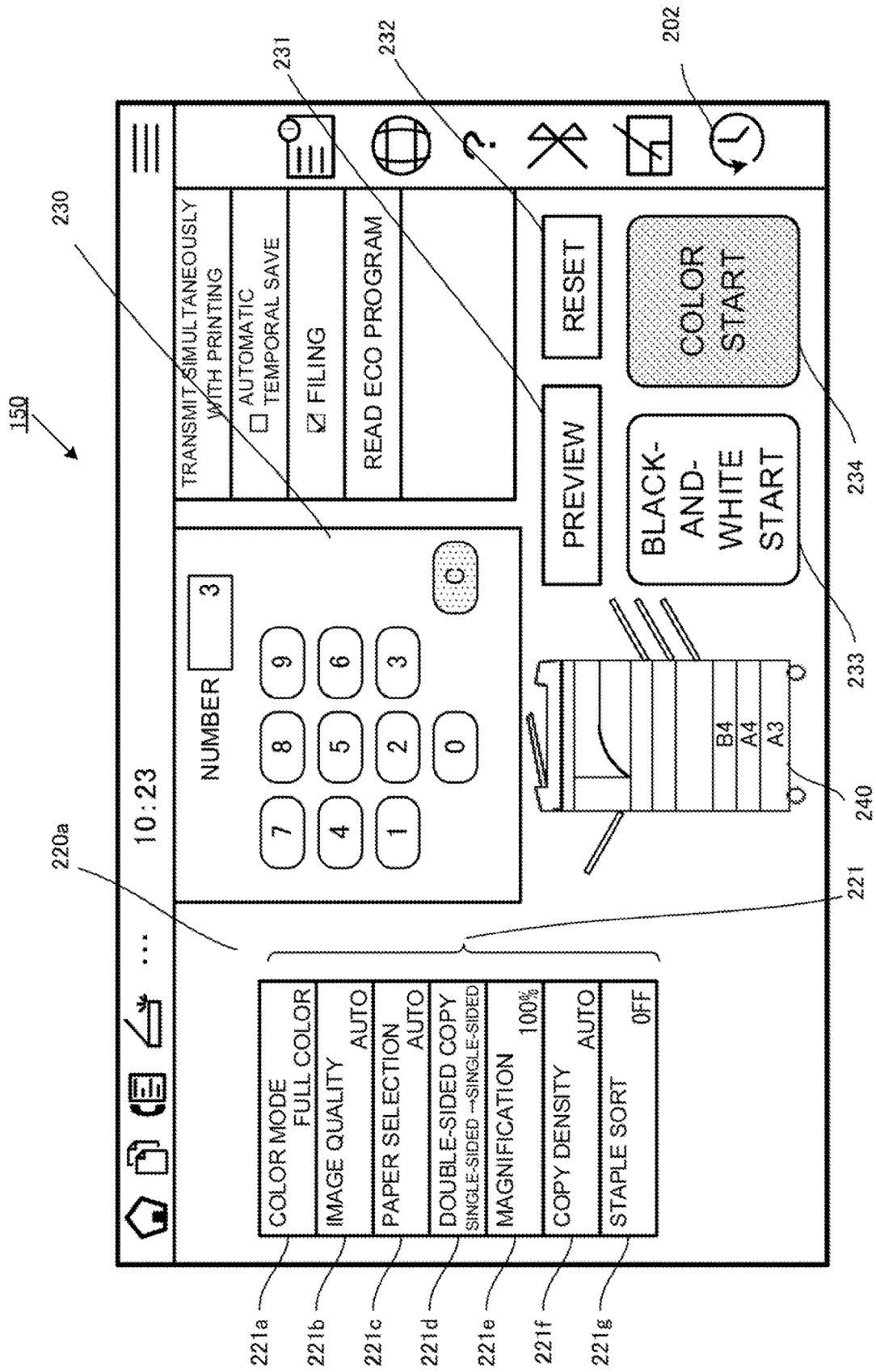
FIG. 7 is an explanatory view illustrating a setting item display screen displayed on the display of the image forming apparatus according to the first embodiment.

When the user clicks the "OK" button 205 on the setting history list screen 203a, the controller 100 confirms the selection of the setting histories 204a, 204c and closes the setting history list screen 203a. Then, the setting item display screen 220 is displayed on the display 150. First, as illustrated in FIG. 7, a setting item display screen 220a related to the setting history 204a is displayed, and when that process is completed, a setting item display screen 220c related to the setting history 204c is displayed as illustrated in FIG. 9.

Various setting items 221 (color mode 221a, image quality 221b, paper selection 221c, double-sided copy 221d, magnification 221e, copy density 221f, staple sort 221g), a number input display 230, a paper arrangement diagram 240 of the image forming apparatus, a preview button 231, a reset button 232, a black-and-white start button 233, and a color start button 234 are displayed on the setting item display screen 220.

Figure 8:
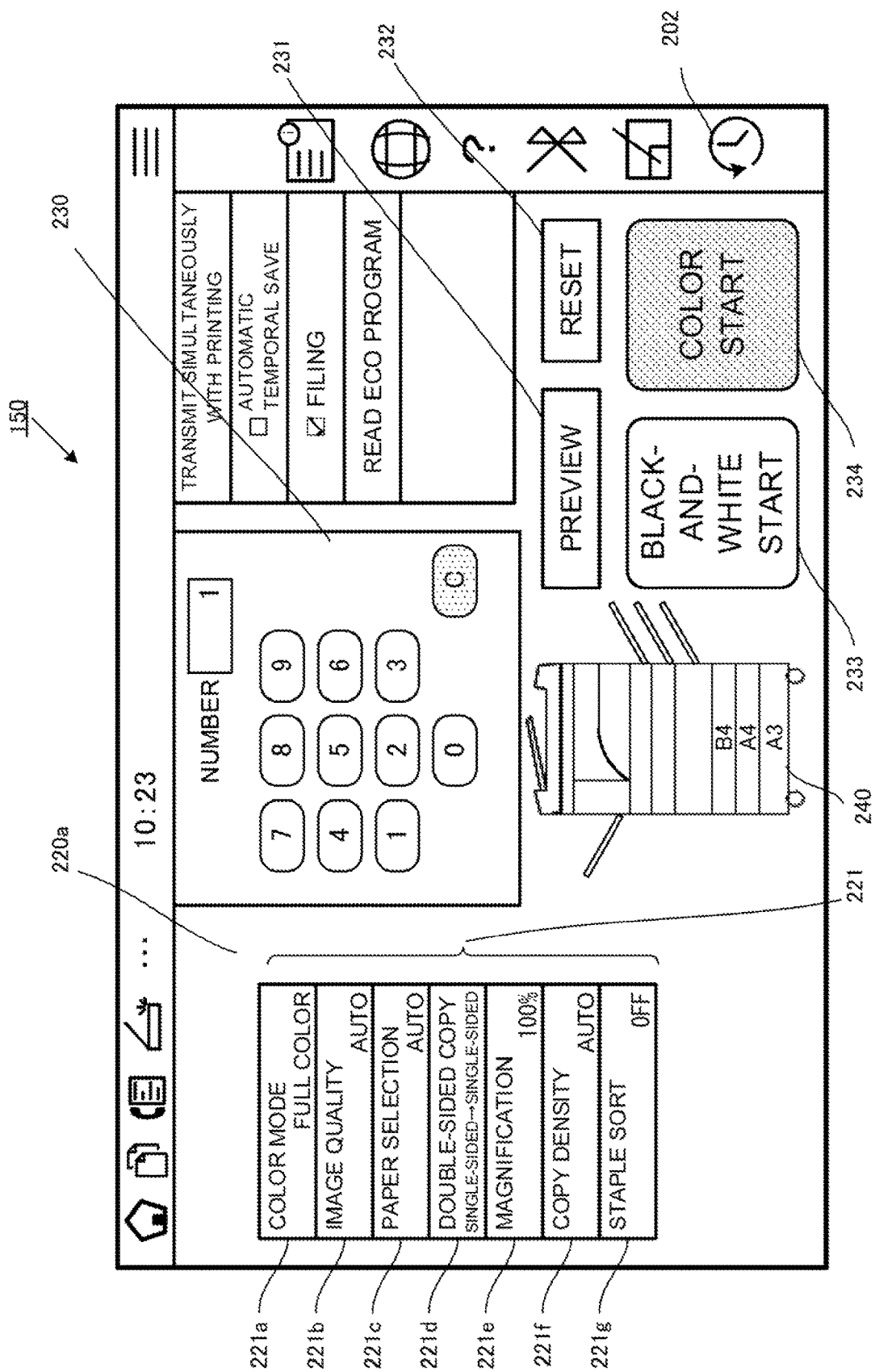
FIG. 8 is an explanatory view illustrating the change of a setting item of the setting item display screen.

When the user clicks the "OK" button 205 of the setting history list screen, the setting item display screen 220 related to the closest one in time among the selected setting histories is displayed. Accordingly, first, the setting item display screen 220a related to the setting history 204a illustrated in FIG. 6 is displayed as illustrated in FIG. 7. In order to change the number of copies from 3 to 1, the user operates the number input display 230 to change the number of copies from 3 to 1 as illustrated in FIG. 8. When the user touches the color start button 234 which is a job execution button, the color copy is executed.

Figure 9:
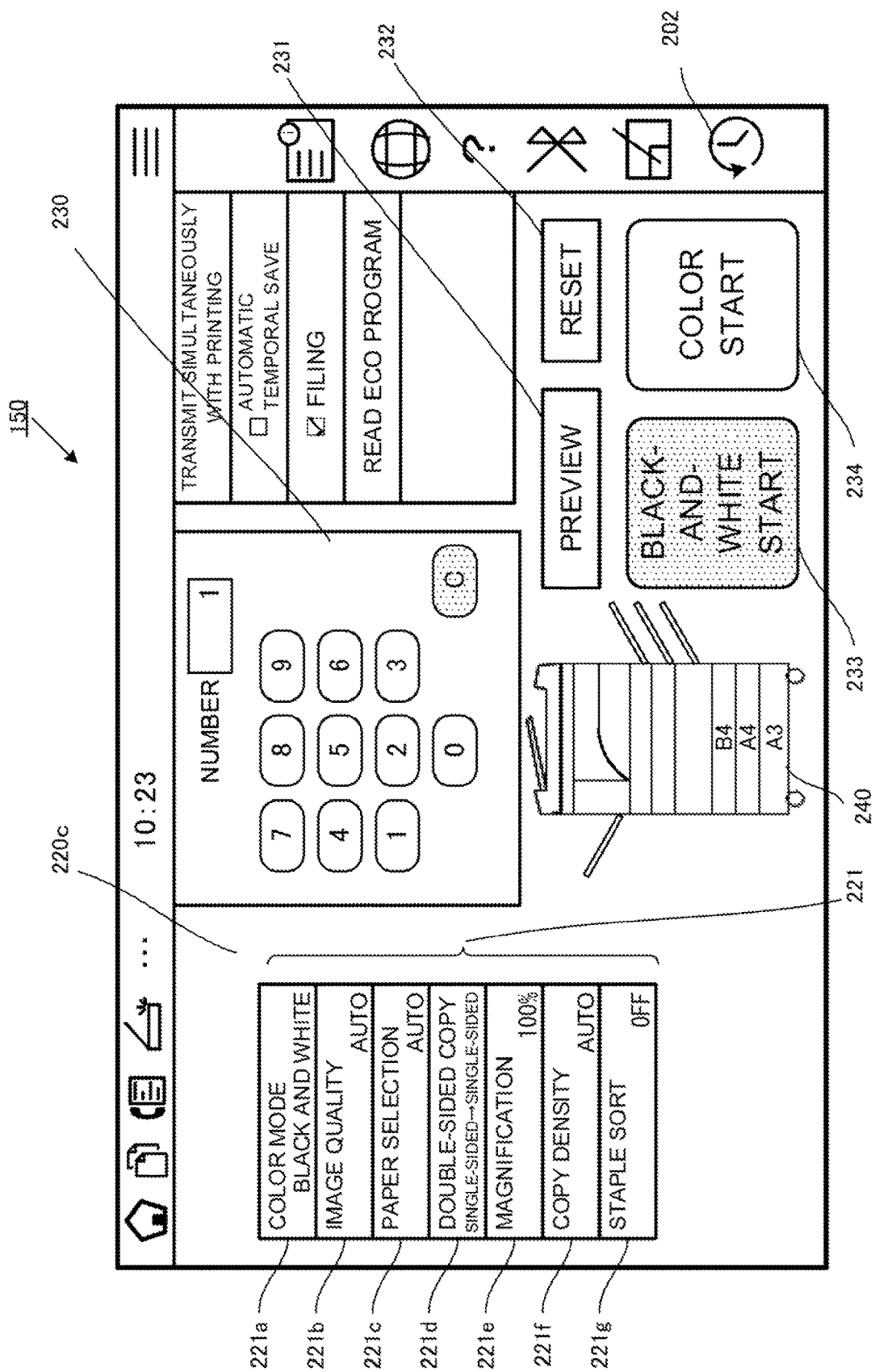
FIG. 9 is an explanatory view illustrating a next setting item display screen displayed on the display of the image forming apparatus according to the first embodiment.

Next, as illustrated in FIG. 9, the controller 100 displays a setting item display screen 220c related to a next selected setting history 204c on the display 150. The user touches the black-and-white start button 233 which is a job execution button, without changing the setting, and the controller 100 executes black-and-white copy.

1.5 Effects

Thus, a user can select a plurality of the setting histories on the setting history list screen and set the selected setting histories before executing a job, and therefore a trouble of calling and selecting the setting history each time a job is executed is eliminated. In addition, the job is executed while checking the settings, and therefore there are few mistakes, and when further change to the settings is necessary, the change can be made. In addition, the job execution button is displayed on the setting item display screen, and therefore once the setting contents are checked, there is no need of transition to a screen for job execution or no need to open a screen for job execution, which eliminates the need for additional operation steps and makes operation more efficient.

2. Second Embodiment

An image forming apparatus 10 of a second embodiment is similar to that of the first embodiment in that a user selects and sets a plurality of desired information from these setting histories, but there is a start button on a setting history list screen, and job settings selected by the user are executed sequentially. When it is necessary to change the setting, it is possible to open a change screen and change the setting.

A configuration of the image forming apparatus is the same as that of the first embodiment, and therefore the description is omitted.

2.1 Flow of Process

Figure 10:
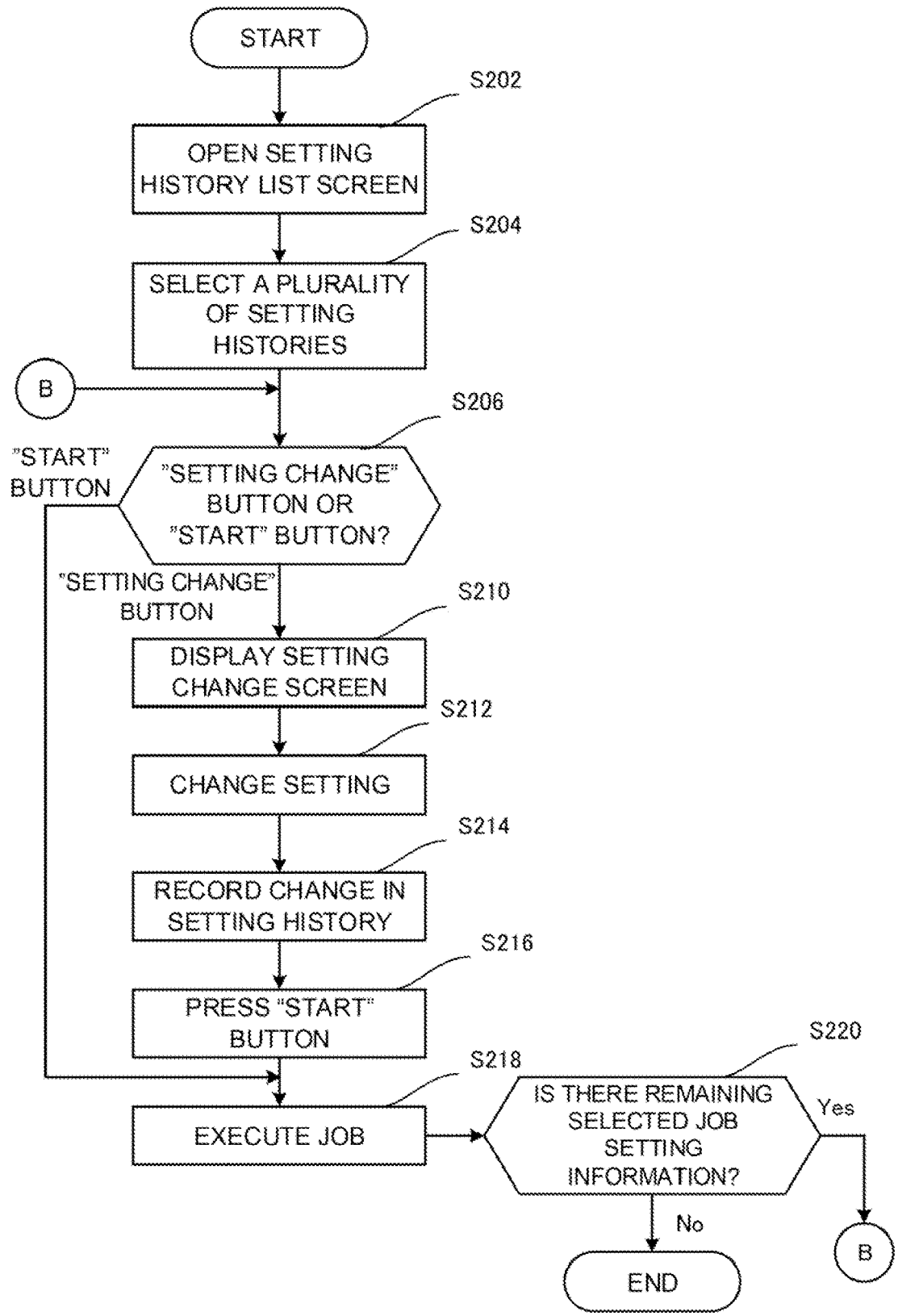
FIG. 10 is a flowchart illustrating a job process including a setting process of an image forming apparatus according to a second embodiment.

A setting process of the image forming apparatus will be described with reference to FIG. 10. FIG. 10 is a flowchart illustrating a job process including the setting process of the image forming apparatus according to the second embodiment.

A user operates a home screen displayed on a display 150 with an operator 160 (for example, clicks a setting history display icon 202a), and a controller 100 opens a setting history list screen on the display 150 (Step S202). The user selects a plurality of setting histories by means of the operator 160 (Step S204). A "Setting Change" button, and a "Start" button" which is a job execution button are displayed on the setting history list screen, and the user selects any of the buttons. The controller 100 checks which button is pressed (Step S206).

When the "Setting Change" button is pressed, the controller 100 displays a setting change screen on the display 150 in Step S210. The setting change screen displays setting items that can be changed, and when the user changes the setting items (Step S212), the controller 100 records the changed setting items as a setting history 122 in a storage 120. Then, when the user presses the "Start" button on the setting change screen, the job is executed (Step S218).

In Step S206, when the "Start" button on the setting history list screen is pressed, the process proceeds to Step S218 to execute the job.

The controller 100 checks whether there is a remaining selected setting history (Step S220), and when there is the selected setting history, the process returns to Step S206. When there is no selected setting history, the process is terminated.

2.2 Operation Example

A specific example of the setting process of the second embodiment will be described on the basis of operation screens of FIGS. 11 to 15.

Figure 11:
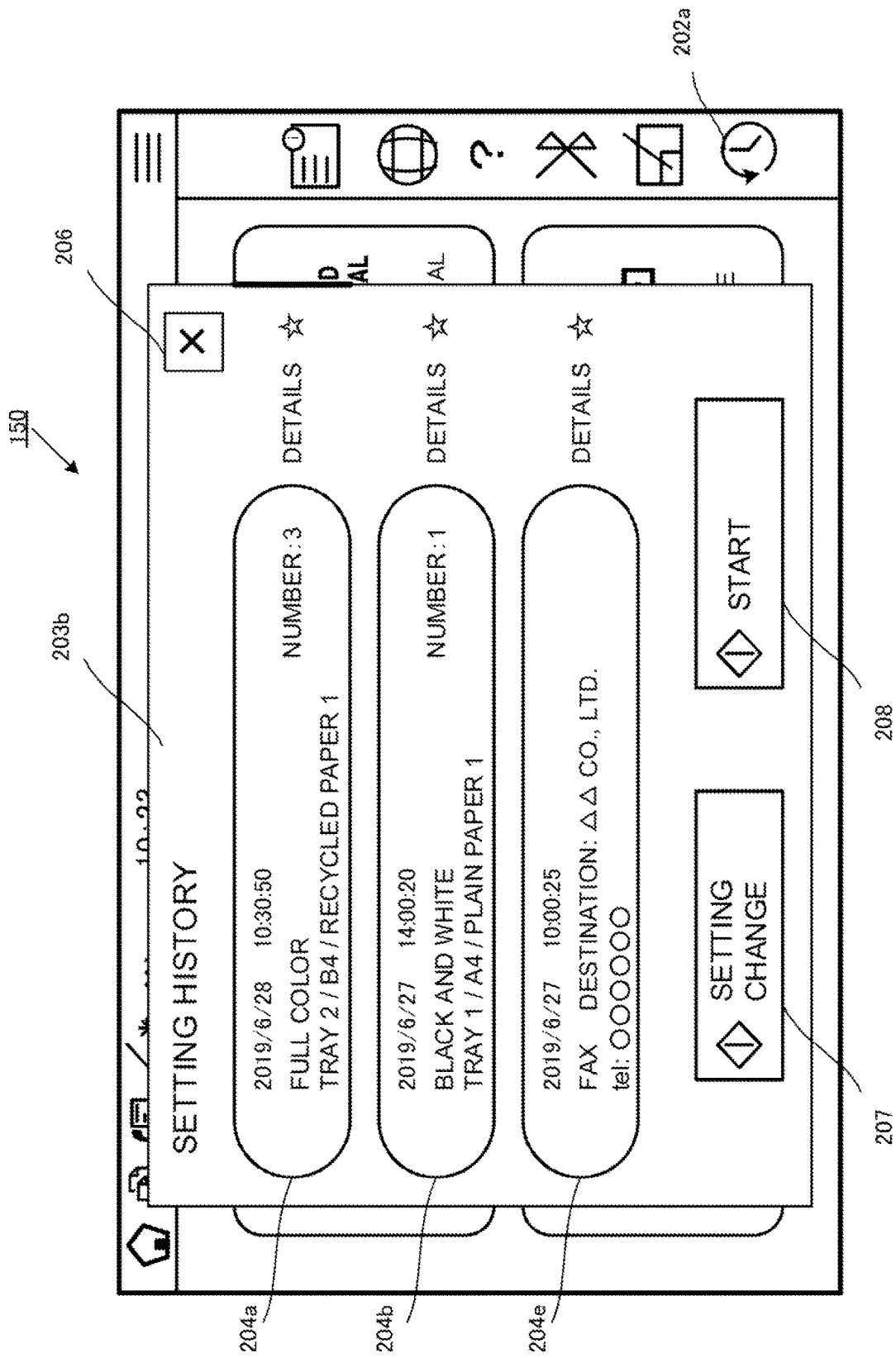
FIG. 11 is an explanatory view illustrating a setting history list screen displayed on a display of the image forming apparatus according to the second embodiment.

When a user touches the setting history display icon 202a in the operation icons 202 of the home screen illustrated in FIG. 4 of the first embodiment, a list screen 203b of the setting history illustrated in FIG. 11 is displayed.

Herein, a copy mode and a fax mode will be described as examples.

Similar to the first embodiment, the setting histories of the previously executed jobs are displayed on the setting history list screen 203b in chronological order with the most recent one at the top. Although FIG. 11 illustrates setting histories 204a, 204b, 204e, even earlier setting histories are displayed by scrolling down. An "×" button 206 for closing the setting history list screen 203b is displayed at the upper right of the setting history list screen 203b. A "Setting Change" button 207 and a "Start" button 208 which is a job execution button are displayed at the bottom of the setting history list screen 203b. The "Setting Change" button 207 is a button for changing setting items in the setting history, and has a function of opening the setting change screen. The "Start" button 208 is a button for executing copy with the settings of the selected setting history.

Figure 12:
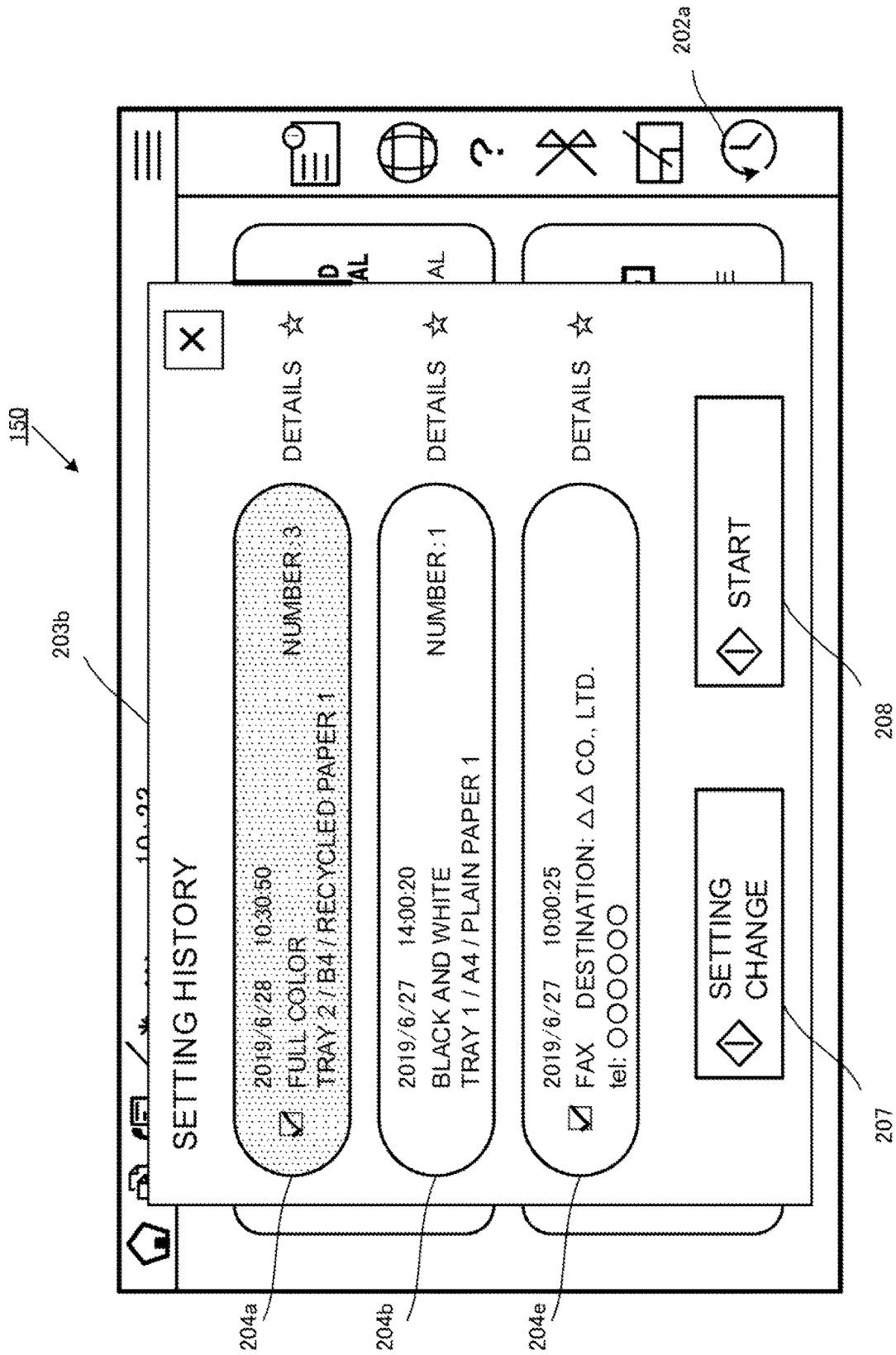
FIG. 12 is an explanatory view illustrating selection of a setting history of the setting history list screen.

The user selects the setting histories 204a, 204e of the setting history. As illustrated in FIG. 12, the controller 100 displays check marks in the setting histories 204a, 204e.

Then, the color of the background of each setting history to be processed is also changed to indicate that the setting history is an object to be processed. In FIG. 12, the color of the background of the setting history 204a which is the object to be first processed is changed.

Figure 13:
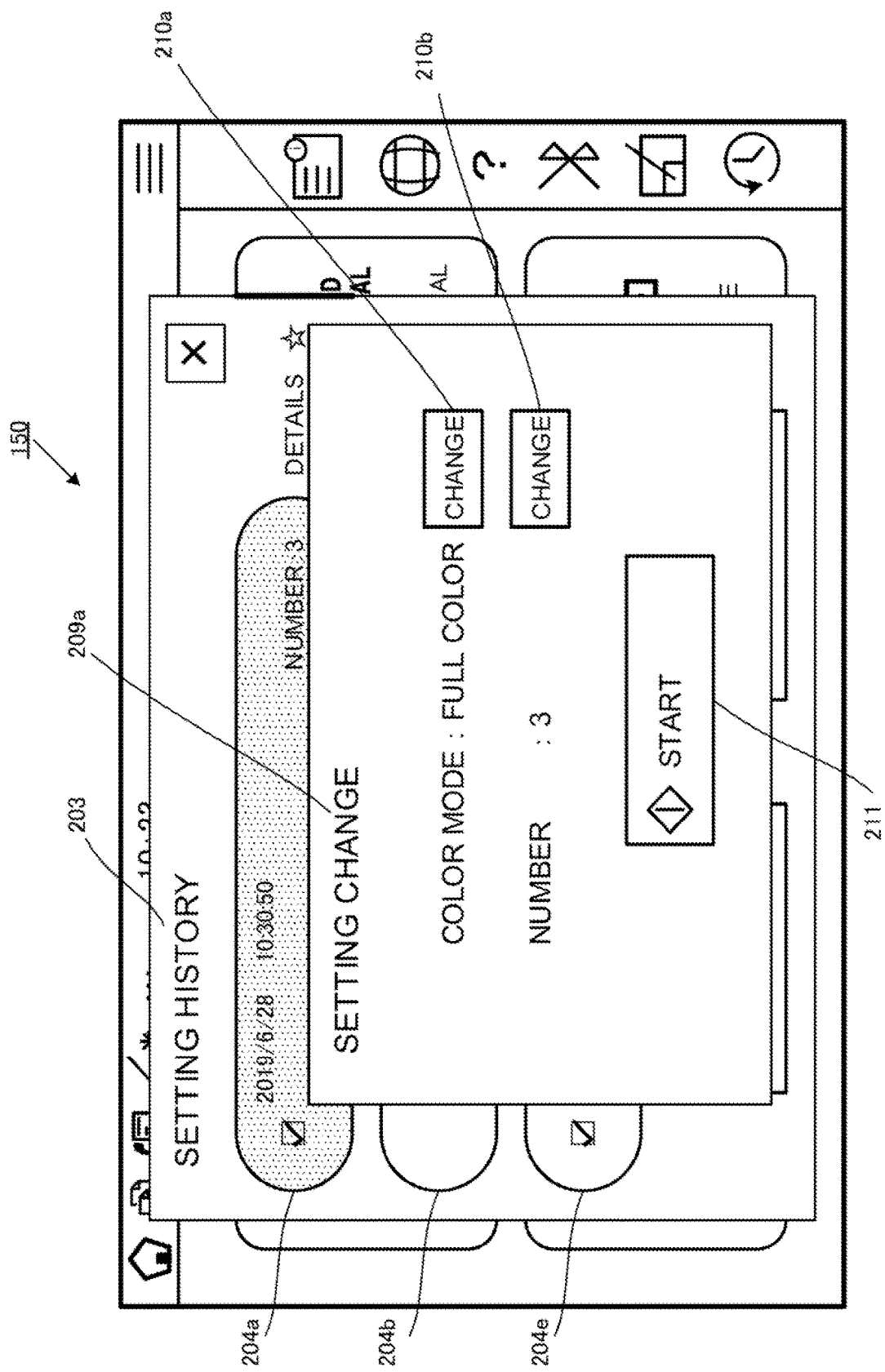
FIG. 13 is an explanatory view illustrating a setting change screen displayed on the display of the image forming apparatus according to the second embodiment.
Figure 14:
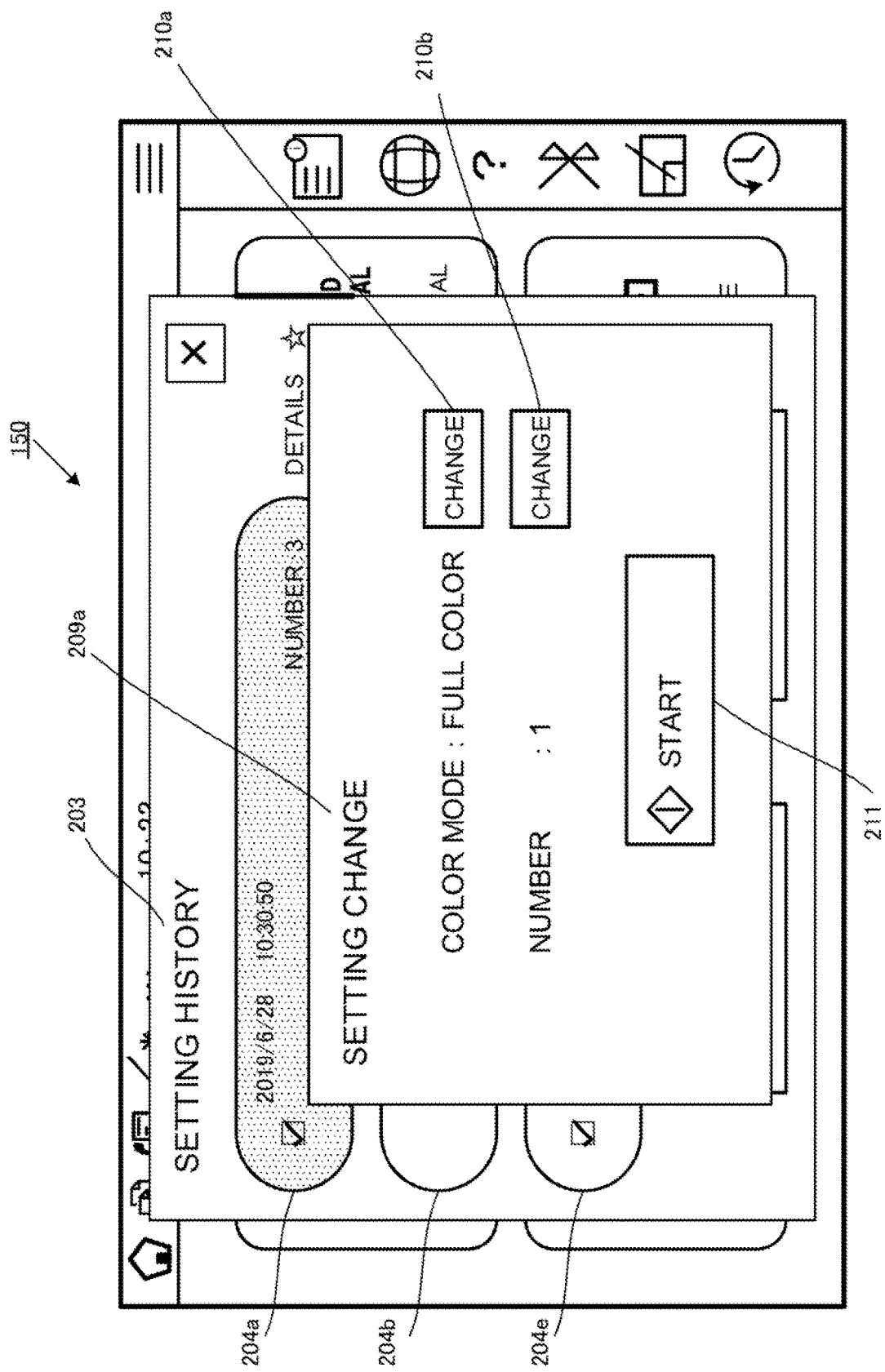
FIG. 14 is an explanatory view illustrating the change of a setting item of the setting change screen.

When the user presses the "Setting Change" button 207, the controller 100 opens a setting change screen 209a related to the setting history 204a, as illustrated in FIG. 13, so that one or some of the settings can be changed. Herein, the color mode and the number of copies can be changed. "Change" buttons 210a and 210b are displayed for the respective items, and changes can be made by pressing these buttons. In FIG. 13, the number of copies is 3, and therefore the user presses the "Change" button 210b and changes the number of copies to 1 by operating the operator 160 as illustrated in FIG. 14.

A "Start" button 211 which is a job execution button is displayed at the bottom of the setting change screen 209a, and the user presses this button, so that the controller 100 executes copy with the settings displayed on the setting change screen 209a, and closes the setting change screen 209a.

Figure 15:
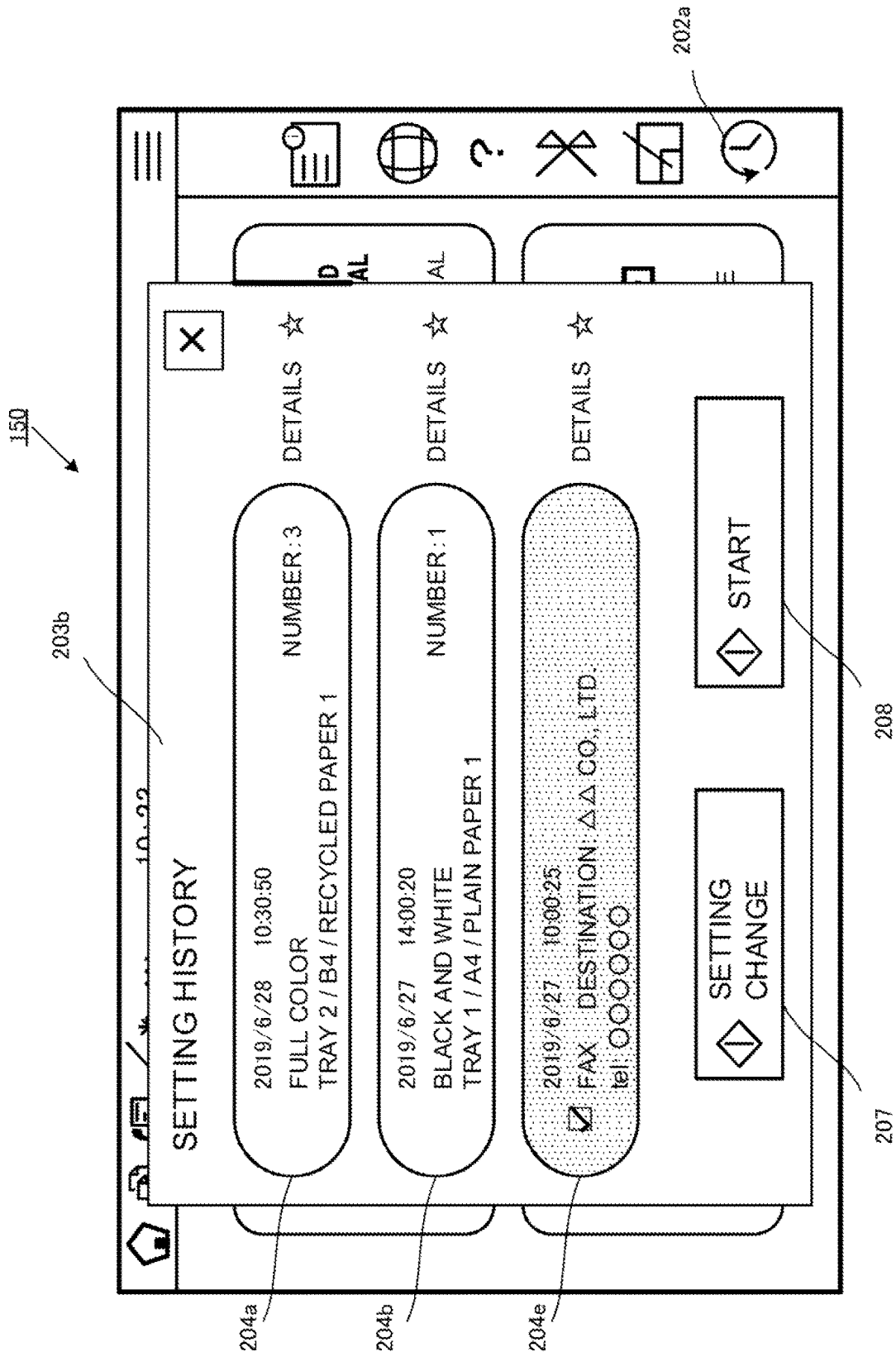
FIG. 15 is an explanatory view illustrating a next processing screen of the setting history list screen displayed on the display of the image forming apparatus according to the second embodiment.

The controller 100 deletes the check mark of the setting history 204a and restores the color of the background to the original because the process of the setting history 204a is completed. Then, as illustrated in FIG. 15, the color of the background of the setting history 204e is changed to indicate that the setting history 204e is an object to be next processed.

When there is no change in the settings of the setting history 204e, the user presses the "Start" button 208 on the setting history list screen, and the controller 100 executes fax with the settings of the setting history 204e.

2.3 Effects

Thus, a user can select a plurality of setting histories on the setting history list screen before executing a job, and therefore a trouble of calling and selecting the setting history each time a job is executed is eliminated. In addition, the job is executed while checking the settings, and therefore there are few mistakes, and when further change to the settings is necessary, the change can be made. The "Start" button which is the job execution button is displayed on each operation screen, and there is no need to perform operation for opening the screen for job execution, which improves operability.

3. Third Embodiment

An image forming apparatus 10 of a third embodiment is similar to that of the first embodiment in that a user selects and sets a plurality of desired information from these setting histories. However, when execution check is displayed to check whether it is OK to execute jobs with the settings of the selected setting histories, and the user determines that it is OK to execute the jobs, all jobs are executed with the settings of the selected setting histories.

A configuration of the image forming apparatus is the same as that of the first embodiment, and therefore the description is omitted.

3.1 Flow of Process

Figure 16:
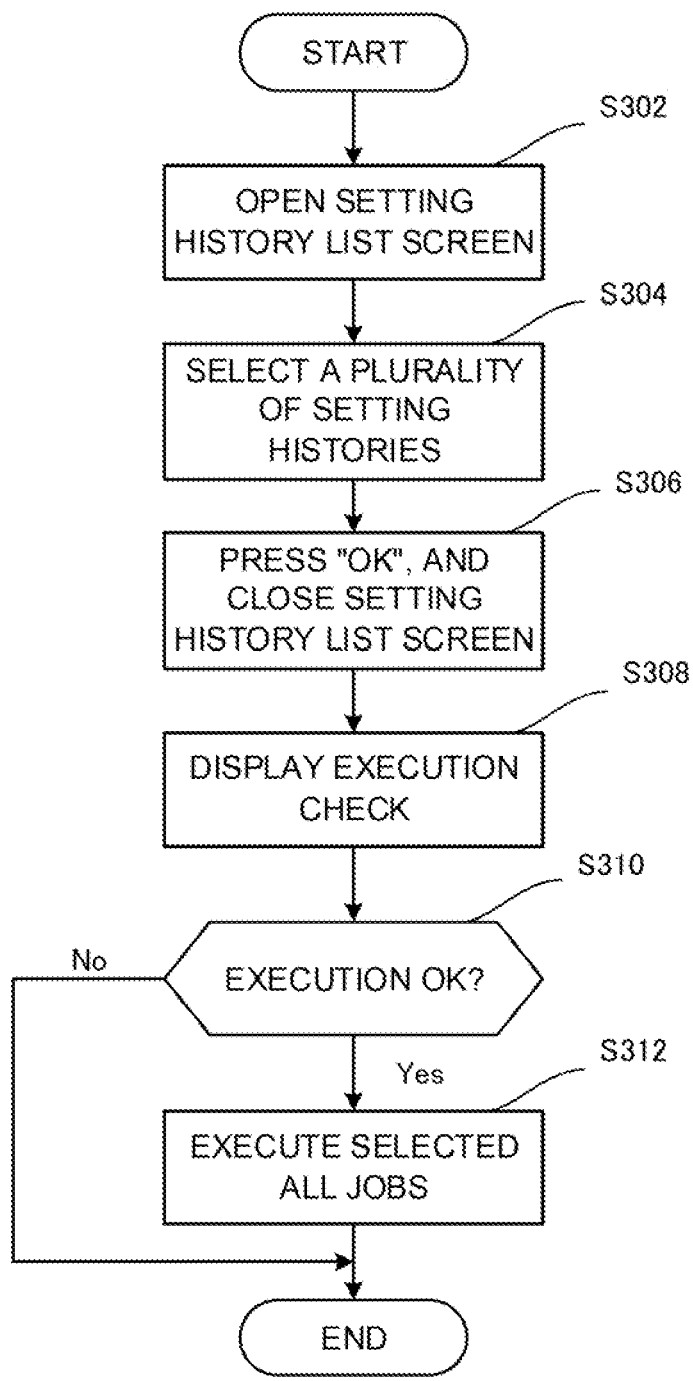
FIG. 16 is a flowchart illustrating a job process including a setting process of an image forming apparatus according to a third embodiment.

A setting process of the image forming apparatus according to the third embodiment will be described with reference to FIG. 16. FIG. 16 is a flowchart illustrating the job process including the setting process of the image forming apparatus according to the third embodiment.

A user operates a home screen displayed on a display 150 with an operator 160 (for example, clicks a setting history display icon 202a), and a controller 100 opens a setting history list screen on the display 150 (Step S302). The user selects a plurality of setting histories by using the operator 160 (Step S304). When the user presses an "OK" button, the controller 100 closes the setting history list screen (Step S306). So far, the steps are the same as Steps S102 to S106 in FIG. 3 of the first embodiment.

Herein, the controller 100 displays an execution check screen superimposed on the home screen, and checks whether or not the user gives execution OK (Step S310). When the execution is OK, all jobs in the selected setting histories are executed. When the execution is not OK, the process is terminated.

3.2 Operation Example

A specific example of the setting process of the third embodiment will be described on the basis of an execution check screen of FIG. 17.

It is assumed that a user selects setting histories 204a, 204c from a setting history list screen 203a, as illustrated in FIG. 6 of the first embodiment. When the user presses an "OK" button 205, the controller 100 closes the setting history list screen 203a, and opens an execution check screen 212 illustrated in FIG. 17. The execution check screen 212 displays wording 213 of "execute all selected history jobs", and displays a "Cancel" button 214, and an "OK" button 215 which is a job batch execution button, at the bottom of the screen.

When the user presses the "OK" button 215, the controller 100 executes the respective jobs of all the selected setting histories. When the user presses the "Cancel" button 214, the controller 100 closes the execution check screen without executing the job.

Herein, no process for changing settings is performed, but a process for changing the setting history selected on the setting history list screen may be included. For example, when the setting history list screen is closed by pressing the "OK" button, a setting changeable screen may be opened to change the setting, and then the execution check screen may be opened.

3.3 Effects

Thus, a user can collectively execute a plurality of jobs after selecting a plurality of setting histories in setting histories, and therefore time and effort are saved. Furthermore, jobs of selected setting histories are executed at once, and therefore the process is even more efficiently performed.

4. Modification

In the image forming apparatus of the present disclosure, a plurality of setting histories can be selected on a setting history list screen, and this combination may be registered as a single setting. The registration format may be registration as a new setting history, or may be registration as a favorite, or the like. Registration setting information for this combination may also function as a shortcut.

A program that operates in the image forming apparatus according to the present disclosure may be a program (a program that causes a computer to function) that controls a CPU (Central Processing Unit) or the like so as to realize the functions of the above embodiments related to the present disclosure. Information handled by these devices is temporarily stored in a RAM (Random Access Memory) at the time of processing, and thereafter is stored in various ROMs such as a Flash ROM (Read Only Memory) and an HDD (Hard Disk Drive), and is read, modified and written by the CPU as necessary. In addition, a program for realizing the function of each configuration may be recorded on a computer-readable recording medium, and the program recorded on the recording medium may be read into the computer system and executed to perform the process of each unit. The "computer system" mentioned herein shall include hardware such as OS and peripheral devices.

The "computer-readable recording medium" refers to a portable medium such as a flexible disk, an optical magnetic disk, a ROM, and a CD-ROM, or a storage device such as a hard disk built into a computer system. The above program may be a program for realizing one or some of the above functions, and may also be capable of realizing the above functions in combination with a program already recorded in the computer system.

The above embodiments are examples for describing the present disclosure, and the technical scope of the invention described in the scope of the claims is not limited to the above description.

What is claimed is:

1. An image forming apparatus that displays a setting history related to a job and executes the job after selection of the setting history, the image forming apparatus comprising:
   a display that displays an operation screen;
   a storage that stores a setting history which comprises past setting information; and
   a controller that performs a display process on the display, a setting process to select the setting history, and a job process to execute the job, wherein the controller:
   displays, on the display, the operation screen including a plurality of setting histories,
   receives a selection of two or more setting histories simultaneously from the plurality of setting histories displayed in the operation screen, and
   for each selected setting history, executes a job based on the selected setting history.

2. The image forming apparatus according to claim 1, wherein
   the selected setting histories are respective pieces of setting information of different job process modes.

3. The image forming apparatus according to claim 1, wherein
   the operation screen further includes an execution button for executing the job related to each selected setting history.

4. The image forming apparatus according to claim 1, wherein
   the controller further displays, on the operation screen, one execution button for executing all the jobs related to all the selected setting histories at once.

5. The image forming apparatus according to claim 1, wherein
   the controller further displays, on the display, the operation screen for enabling changes of respective pieces of setting information associated with the selected setting histories.

6. The image forming apparatus according to claim 1, wherein
   the controller further registers a combination of the selected setting histories as a single setting.

7. A method for controlling an image forming apparatus that includes a display and a storage, and displays a setting history comprising past setting information related to a job and executes the job after selection of the setting history, the method comprising:
   displaying, on the display, an operation screen including a plurality of setting histories;
   receiving a selection of two or more setting histories simultaneously from the plurality of setting histories displayed in the operation screen; and
   for each selected setting history, executing a job based on the selected setting history.

8. An image forming apparatus that displays a setting history related to a job and executes the job after selection of the setting history, the image forming apparatus comprising:
   a display that displays an operation screen;
   a storage that stores a setting history which comprises past setting information; and
   a controller that performs a display process on the display, a setting process to select the setting history, and a process to execute the job, wherein the controller:
   displays, on the display, the operation screen including a plurality of setting histories,
   receives a selection of two or more setting histories simultaneously from the plurality of setting histories displayed in the operation screen, and
   for each selected setting history, executes a job based on the selected setting history, wherein
   the operation screen further includes an execution button for executing all the jobs related to all the selected setting histories at once.

9. The image forming apparatus according to claim 8, wherein
   the controller further displays, on the display, the operation screen for enabling changes of respective pieces of setting information associated with the selected setting histories.

10. The image forming apparatus according to claim 8, wherein
    the controller further registers a combination of the selected setting histories as a single setting.

* * * * *